(Model.)
A. V. BROKHAHNE & C. LANGBEIN.
ATTACHABLE AND DETACHABLE BACK FOR RAZOR BLADES.
No. 377,926. Patented Feb. 14, 1888.
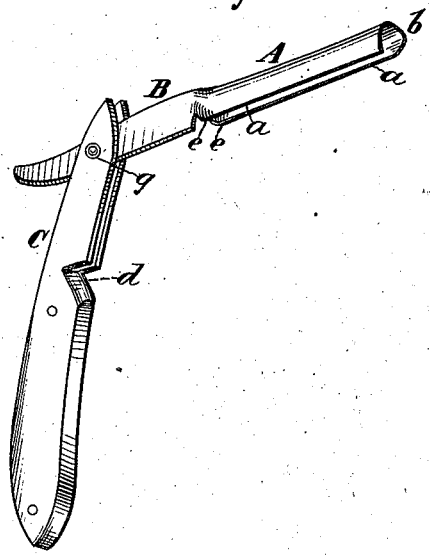
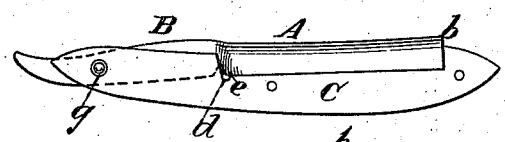
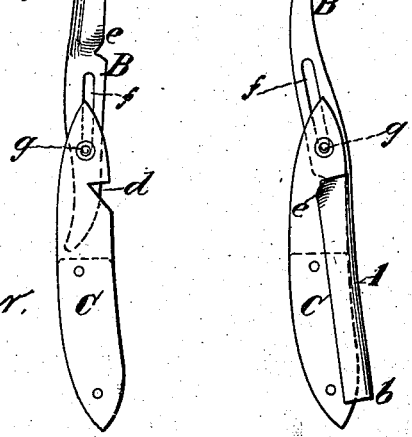
WITNESSES
John Becker
Jno. C. Gavin
INVENTORS
Alfred V. Brokhahne
Chas. Langbein
by Chas. M. Higgins
Attorney

UNITED STATES PATENT OFFICE.

ALFRED VICTOR BROKHAHNE, OF NEW YORK, AND CHARLES LANGBEIN, OF BROOKLYN, NEW YORK; SAID BROKHAHNE ASSIGNOR TO SAID LANGBEIN.

ATTACHABLE AND DETACHABLE BACK FOR RAZOR-BLADES.

SPECIFICATION forming part of Letters Patent No. 377,926, dated February 14, 1888.

Application filed April 6, 1887. Serial No. 233,818. (Model.)

*To all whom it may concern:*

Be it known that we, ALFRED VICTOR BROKHAHNE, of New York city, county and State of New York, and CHARLES LANGBEIN, of Brooklyn, Kings county, New York, have jointly invented certain new and useful Improvements in Attachable and Detachable Backs for Razor-Blades, of which the following is a specification.

Our invention relates to detachable spring-backs primarily intended for holding the blades of safety-razors—as, for example, such as that for which Letters Patent were granted to F. and O. F. Kampfe, June 15, 1880, No. 228,904; but it is also applicable to the holding of a detachable blade for razors for actual use in shaving.

It consists, partly, in the combination of a detachable and attachable spring-back for holding the blade of a razor for stropping the same or for shaving with the same, and a tang attached to said spring-back and pivoted to a handle for conveniently holding the same while stropping or shaving.

It further consists in the combination of a detachable or attachable spring-back for holding the blade of a razor while stropping the same or while shaving therewith, and a tang attached to said spring-back, the tang being provided with a slot, and a handle to which said tang is pivoted in said slot, whereby in closing said detachable back down upon or into the handle the length of the handle may be made shorter without lessening its efficiency.

The invention also consists in certain details of construction, which will appear from the following description with reference to the drawings, in which—

Figure 1 represents the detachable back of a razor with its tang pivoted to a handle in such manner as to be closed down upon the same, as hereinafter described. Fig. 2 represents the detachable back, tang, and handle after the back has been closed down upon the handle; and Figs. 3 and 4 represent the modification of the invention by the introduction of the slotted tang, whereby a much shorter handle is rendered available. Fig. 5 is an end view of Fig. 2 at the end farthest from the hinge, showing the back A overlapping the handle C.

A represents the detachable spring-back, B the tang, and C the handle.

The back A is formed with a cross-section, which may be said to be tubular, with a slot, $a$, cut through its entire length on the inner side, as shown in Figs. 1 and 5. This slot is for the reception of the blade of the razor, which is thrust into the detachable and attachable back A from the outer end, $b$, toward the tang, and is of such thickness that the edges of the slot $a$ will clamp tightly down upon the blade to hold it firmly in the clasp of the detachable and attachable back A when the blade is being stropped or used for shaving.

The handle C is preferably made of such thickness as to fill and fit easily the slot $a$ in the detachable back A when said back is closed down upon the handle, as shown in Fig. 2; but we do not limit ourselves to this construction, as we reserve the right to close the detachable back into the handle, after the manner of ordinary razors, if we so elect.

When the detachable back is closed down upon the handle C, as shown in Fig. 2, the parts $e$ of said back, which join with easy curves the tang B, as shown in Figs. 1, 2, 3, and 4, enter into a notch, $d$, formed in the front of the handle, as also shown in said figures. This notch will not be necessary if the back closes into the handle as above explained.

In order to be able to use a much shorter handle than is shown in Figs. 1 and 2, the tang may be slotted, as shown at $f$ in Figs. 3 and 4. This enables the tang to be slid along the pivot $g$, in closing to take the position shown in Fig. 4, the relative positions of the tang and handle when open being shown in Fig. 3.

This improvement supplies a small portable and handy instrument for holding the blades of safety-razors in stropping the same and keeping them in order, which has hitherto been a desideratum in the use of such razors; and, as above stated, it may also be used for holding the blade of a razor for shaving when so desired.

Having thus described our invention, what we claim as new, and desire to secure by Letters Patent, is as follows:

1. An attachable and detachable spring-back having a socket, $a$, for holding the tangless blade of a razor for stropping the same or for use in shaving, and a tang, B, with a longitudinal slot, f, therein, in combination with the handle C, pivoted in said slot and adapted to fit in the socket of said spring-back when the latter is closed down upon the said handle, substantially as herein described.

2. The combination, with the short handle C, of the spring-back A, having slotted tang B, pivoted to the end of said handle, and having a dovetailed socket-groove adapted to receive a removable tangless blade, substantially as and for the purpose set forth.

ALFRED VICTOR BROKHAHNE.
CHARLES LANGBEIN.

Witnesses:
JNO. E. GAVIN,
CHAS. M. HIGGINS.